United States Patent
Humpherys et al.

(10) Patent No.: US 12,530,694 B2
(45) Date of Patent: Jan. 20, 2026

(54) USING ENTITLEMENTS DEPLOYED ON BLOCKCHAIN TO MANAGE CUSTOMER EXPERIENCES

(71) Applicant: ADOBE INC., San Jose, CA (US)

(72) Inventors: David Humpherys, Lehi, UT (US); Jonathan Lancar, Sunny Isles, FL (US)

(73) Assignee: ADOBE INC., San Jose, CA (US)

( * ) Notice: Subject to any disclaimer, the term of this patent is extended or adjusted under 35 U.S.C. 154(b) by 119 days.

(21) Appl. No.: 18/467,695

(22) Filed: Sep. 14, 2023

(65) Prior Publication Data
US 2025/0094996 A1    Mar. 20, 2025

(51) Int. Cl.
*G06Q 30/01*    (2023.01)

(52) U.S. Cl.
CPC .................. *G06Q 30/01* (2013.01)

(58) Field of Classification Search
CPC ....................................... G06Q 30/01
See application file for complete search history.

(56) References Cited

U.S. PATENT DOCUMENTS

| | | |
|---|---|---|
| 8,332,290 B1 | 12/2012 | Venturo et al. |
| 2017/0286987 A1 | 10/2017 | Carter et al. |
| 2019/0325473 A1 | 10/2019 | Swamidurai |
| 2022/0045849 A1* | 2/2022 | Jing .................. H04L 9/088 |
| 2022/0051279 A1 | 2/2022 | Czajka et al. |
| 2022/0292268 A1 | 9/2022 | Shillingford et al. |
| 2022/0351192 A1 | 11/2022 | Mcgregor et al. |
| 2022/0385477 A1* | 12/2022 | Kravitz .................. H04L 9/3247 |
| 2023/0111668 A1 | 4/2023 | Metnick et al. |
| 2023/0129576 A1 | 4/2023 | Root |
| 2023/0244938 A1 | 8/2023 | Wei et al. |
| 2023/0297345 A1* | 9/2023 | Khalfan ............. G06Q 20/1235 717/107 |

(Continued)

FOREIGN PATENT DOCUMENTS

| | | |
|---|---|---|
| CN | 107491964 A | 12/2017 |
| CN | 114817932 A | 7/2022 |
| CN | 116662991 A | 8/2023 |

OTHER PUBLICATIONS

Coinbase, Why Digital Signatures are essential for blockchains, [online], published on Jan. 26, 2022, available at: < https://www.coinbase.com/developer-platform/discover/dev-foundations/digital-signatures >.*

(Continued)

*Primary Examiner* — Richard W. Crandall
(74) *Attorney, Agent, or Firm* — Shook, Hardy & Bacon L.L.P.

(57) ABSTRACT

Methods and systems are provided for using entitlements deployed on blockchain to manage customer experiences. In embodiments described herein, customer data for a customer is accessed via a blockchain-based entitlement generator component. A representation of an entitlement for the customer is generated based on a plurality of parameters of the entitlement via the blockchain-based entitlement generator component where the representation of the entitlement includes a portion of the customer data for the customer. The representation of the entitlement is recorded on a blockchain via the blockchain-based entitlement generator component.

16 Claims, 7 Drawing Sheets

(56) References Cited

U.S. PATENT DOCUMENTS

| | | | |
|---|---|---|---|
| 2023/0306427 A1* | 9/2023 | Unagami | G06Q 30/0201 |
| 2023/0351464 A1* | 11/2023 | Beausoleil | G06Q 30/018 |
| 2023/0360329 A1 | 11/2023 | Esquivel et al. | |
| 2024/0013199 A1 | 1/2024 | Marshall et al. | |
| 2024/0086918 A1* | 3/2024 | Gisolfi | G06Q 20/34 |
| 2024/0185209 A1* | 6/2024 | Skipper | G06Q 30/0207 |
| 2024/0330605 A1 | 10/2024 | Hunn et al. | |
| 2024/0330927 A1 | 10/2024 | Abdelrahman et al. | |
| 2024/0394705 A1 | 11/2024 | Abdelrahman et al. | |
| 2025/0156828 A1 | 5/2025 | Sliwka et al. | |

OTHER PUBLICATIONS

Nguyen et al., "False Alarm Reduction Method for Weakness Static Analysis Using BERT Model", Applied Sciences, vol. 13, No. 6, Mar. 9, 2023, pp. 1-13.

Non-Final Office Action received for U.S. Appl. No. 18/458,856, mailed on Mar. 13, 2025, 14 pages.

Non-Final Office Action received for U.S. Appl. No. 18/530,619, mailed on May 29, 2025, 36 pages.

Dubey et al., "Confluence of Artificial Intelligence and Blockchain Powered Smart Contract in Finance System," 2022 International Conference on Computing, Communication, and Intelligent Systems (ICCCIS), 2022, pp. 125-130.

Napoli et al., "Evaluating ChatGPT for Smart Contracts Vulnerability Correction," 2023 IEEE 47th Annual Computers, Software, and Applications Conference (COMPSAC), 2023, pp. 1828-1833.

Non-Final Office Action received for U.S. Appl. No. 18/458,856, mailed on Sep. 16, 2025, 16 pages.

* cited by examiner

US 12,530,694 B2

USING ENTITLEMENTS DEPLOYED ON BLOCKCHAIN TO MANAGE CUSTOMER EXPERIENCES

BACKGROUND

Blockchain technologies offer businesses and customers an open and transparent framework for exchanging value in the form of fungible and non-fungible tokens ("NFTs"). However, while native blockchain technologies offer many advantages for engagement of the customer with the business, native blockchain technologies lack features that businesses require to continuously and personally engage with customers at scale.

SUMMARY

Various aspects of the technology described herein are generally directed to systems, methods, and computer storage media for, among other things, using entitlements deployed on blockchain to manage customer experiences. In this regard, embodiments described herein facilitate using entitlements deployed on blockchain to manage customer experiences by allowing a business to customize the parameters of entitlements offered by the business, including the parameters of the entitlements for all customers of a business, specific audience segments of the business, or individual customers of the business. Following events triggering the offering of an entitlement, such as interactions of a customer with the business, the entitlement can be automatically modified based on customer data of the customer with respect to the parameters of the entitlement and recorded on blockchain as a blockchain-based entitlement for the customer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Definitions

Figure 1:
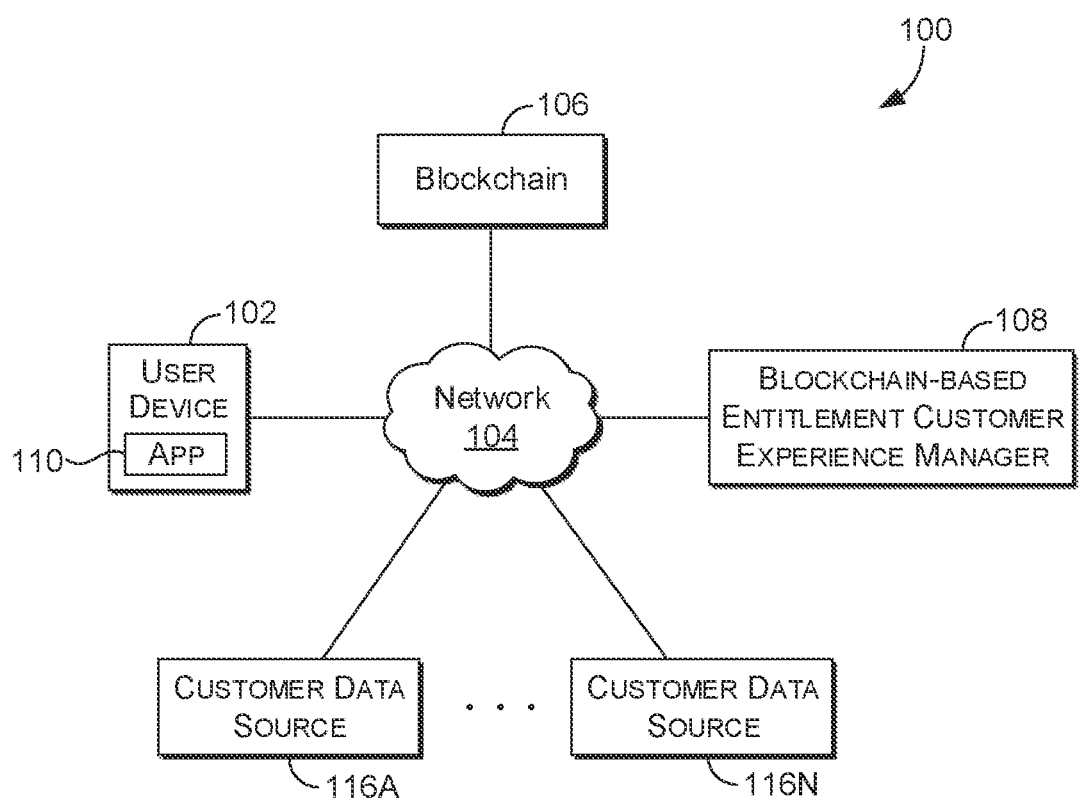
FIG. 1 depicts a diagram of an environment in which one or more embodiments of the present disclosure can be practiced, in accordance with various embodiments of the present disclosure.

Various terms are used throughout the description of embodiments provided herein. A brief overview of such terms and phrases is provided here for ease of understanding, but more details of these terms and phrases is provided throughout.

"Blockchain" refers to a decentralized digital ledger technology that records transactions across multiple computers in a secure and transparent manner. Blockchain uses cryptographic techniques to ensure the immutability and integrity of data. Blockchain typically operates in a trustless transaction environment, which refers to a system or network where participants can engage in transactions or exchanges without requiring a central authority. Instead, trust is established through cryptographic protocols and consensus mechanisms. Examples of applications utilizing blockchain include cryptocurrencies, smart contracts, etc. A public blockchain is a type of blockchain network that is open and accessible to anyone and without requiring approval to participate whereas a private blockchain is a type of blockchain network where access and permissions to participate are restricted. A "blockchain virtual machine" refers to a virtual execution environment that operates within a blockchain network and allows developers to deploy and execute smart contracts on the blockchain platform.

A "smart contract" refers to a digital contract with the terms and/or conditions of an agreement directly written into code, which is referred to as "smart contract code." A smart contract automatically enforces and executes the agreed-upon actions when certain conditions are met, without the need for a central authority or an intermediary, through the smart contract code of the smart contract. Smart contracts are often used on blockchain platforms to ensure transparency, security, and automation in various processes, such as financial transactions, digital identity verification, etc. Examples of languages for drafting smart contracts include solidity, teal, etc.

A "fungible token" refers to a type of digital asset that represents ownership or value and is interchangeable with other fungible tokens of the same type. In this regard, each unit of a fungible token is identical and can be exchanged on a one-to-one basis, similar to how physical currency works. A "non-fungible token ("NFT")" refers to a unique digital asset that represents ownership or proof of authenticity of a specific item or specific piece of content. Unlike fungible tokens, each NFT is distinct and cannot be exchanged on a one-to-one basis with other tokens.

"Entitlements" refers to rights, benefits, and/or privileges provided to a customer has based on their purchase or relationship with a business. Entitlements can vary based on the type of business, industry, and the specific offerings provided to customers by the business. For example, depending on the product or service acquired by the customer, entitlements can include access to certain features, services, support, upgrades, or discounts. Additional examples of entitlements include: (1) software entitlements that may provide access to specific software features based on the type of software license; (2) support entitlements that may provide priority or extended customer support; (3)

membership entitlements that may provide exclusive access to members-only content; (4) subscription entitlements that may provide access to premium content; (5) upgrade entitlements that may provide eligibility for a free upgrade of a product; (6) discount entitlements that may provide discounts on products or services; (7) warranty entitlements that may provide coverage for repairs or replacements for a period of time; (8) service entitlements that may provide access to certain features, like priority boarding for airlines; (9) refund entitlements that may provide the ability to request refunds or returns; (10) customization entitlements that may provide options to customize products or services to suit individual preferences; and/or etc.

A "universal entitlement" refers to a type of entitlement that is the same for all customers. In this regard, a universal entitlement can be offered to all customers of a business without audience segment qualification or personalization. An example of a universal entitlement can include a loyalty program credential entitling members to universal benefits under the program.

A "categorical entitlement" refers to a type of entitlement that is the same for each customer within a specific audience segment. An "audience segment" refers to a specific group of individuals or businesses that share similar customer data, characteristics, needs, behaviors, or preferences. In this regard, a categorical entitlement can be offered to customers of a certain product or service who meet certain qualifying conditions. An audience segment may be also referred to as a customer segment. An example of a categorical entitlement can include a pre-defined warranty awarded only to customers that purchase a specific product or from a specific category of products.

A "personalized entitlement" refers to a type of entitlement that is uniquely generated for a specific customer. In some embodiments, personalized entitlements can be dynamically assembled in batches and can include personalized parameters for the specific customer. In some embodiments, personalized entitlements can be dynamically assembled during real-time interactions with the customer and can include personalized parameters for the specific customer. In this regard, a business can define a personalized entitlement for a specific customer by defining variables, such as the parameter types, parameter data sources and benefits, which are written into a personalized smart contract for the specific customer and deployed on a blockchain virtual machine. An example of a personalized entitlement can include a discount token on merchandise with a personalized discount rate, list of eligible products, and validity for a specific customer.

"Customer data" refers to any data regarding a customer or customers. Customer data within a dataset may include, by way of example and not limitation, data that is sensed or determined from one or more sensors, such as location information of mobile device(s), smartphone data (such as phone state, charging data, date/time, or other information derived from a smartphone), activity information (for example: app usage; online activity; searches; browsing certain types of webpages; listening to music; taking pictures; voice data such as automatic speech recognition; activity logs; communications data including calls, texts, instant messages, and emails; website posts; other user data associated with communication events) including activity that occurs over more than one device, user history, session logs, application data, contacts data, calendar and schedule data, notification data, social network data, news (including popular or trending items on search engines or social networks), online gaming data, ecommerce activity, including customer journey data, sports data, health data, and nearly any other source of data that may be used to identify the customer.

A "customer journey" refers to a series or sequence of interactions between a customer and a business over time. Journeys occur over various channels, such as e-mail, phone calls/texting, social media, websites, physical locations, and any channel in which a customer and business interact. A customer journey can include a set of one or more events, conditions, and/or corresponding actions (e.g., responses). To this end, a customer journey can include a sequence of events, conditions, and/or actions (e.g., responses) through which customers may traverse. Customer journeys can be designed by users, such as marketers or businesses, to meet the goals of the business, such as to obtain new customers, develop leads, increase conversions, and increase loyalty. Customer journeys can be designed with various paths based on customer interactions, behavior, preferences, customer demographics, etc.

"Trigger-generating" refers to causing or initiating the generation of an output or response in response to input, such as an action or event, in order to automate processes in software.

Overview

Blockchain technologies offer businesses and customers an open and transparent framework for exchanging value in the form of fungible and non-fungible tokens ("NFTs"). However, while native blockchain technologies offer many advantages for engagement of the customer with the business, native blockchain technologies lack features that businesses require to continuously and personally engage with customers at scale. For example, blockchain powered technologies, such as collectible NFTs, etc., may have a unique asset or content associated with a token, but the uniqueness is limited to the asset or content and does not change based on the customer purchasing the collectible NFT.

Currently, in order for the business to offer blockchain-based offerings (e.g., fungible and/or non-fungible tokens related to a business's offerings), a business must manually design, program and test, or hire a programmer to manually design, program and test, the blockchain-based offerings. For any customizations to the blockchain-based offerings, blockchain-based offerings must be manually designed for the specific scenario. In this regard, the process of customizing blockchain-based offerings is a manual intensive process requiring the manual design, programming, testing before deploying of each customized blockchain-based offerings. As such, businesses are not willing to offer certain blockchain-related offerings due to the computing resources required.

Accordingly, unnecessary computing resources are utilized by businesses offering blockchain-based offerings in conventional implementations. For example, computing and network resources are unnecessarily consumed to facilitate the manual intensive process in order to offer customized blockchain-based offerings. For instance, computer input/output operations are unnecessarily increased in order for a business to develop each customized blockchain-based offering. In this regard, the designing, programming and testing of each customized blockchain-based offering to develop each customized blockchain-based offering is computationally expensive. Further, when the information related to developing the customized blockchain-based offering is located in a disk array, there is unnecessary wear placed on the read/write head of the disk of the disk array each time the information is accessed. Even further, the processing of operations for the designing, programming and testing of each customized blockchain-based offering to develop each customized blockchain-based offering decreases the throughput for a network, increases the network latency, and increases packet generation costs when the information is located over a network. In this regard, usage of network resources is multiplied due to the amount of information pertaining to the development of customized blockchain-based offerings that must be manually accessed, manually searched for, and manually generated by a business and/or customer.

As such, embodiments of the present disclosure are directed to using entitlements deployed on blockchain to manage customer experiences in an efficient and effective manner. In this regard, blockchain-based entitlements can be efficiently and effectively customized by a business and personalized to customers of the business.

Generally, and at a high level, embodiments described herein facilitate using entitlements deployed on blockchain to manage customer experiences by allowing a business to customize the parameters of entitlements offered by the business, including the parameters of the entitlements for all customers of a business, specific audience segments of the business, or individual customers of the business. Following events triggering the offering of an entitlement, such as interactions of a customer with the business, the entitlement can be automatically modified based on customer data of the customer with respect to the parameters of the entitlement and recorded on blockchain as a blockchain-based entitlement for the customer.

In operation, entitlements can be designed and/or deployed by a business in order to record the entitlements on blockchain (e.g., public blockchain or private blockchain) following certain events, such as interactions with customers. For example, a business user (e.g., a user associated with the business) can define various types of entitlements, including parameters related to the entitlements, services, subscriptions, benefits, and/or etc., that the business offers to customers (e.g., as part of their commercial product and service offerings, promotional and loyalty programs, etc.). In some embodiments, the business user defines how the customers access or redeem entitlement benefits (e.g., access subscription content, enter a venue, return a product, access customer support, etc.). For example, a business user of an airline can define parameters of an entitlement that allows a customer to book a flight and hotel following a flight cancellation and define parameters related to the applications, websites, airlines, hotels, etc. at which the entitlement can be redeemed.

In some embodiments, the business user can define parameters for a universal entitlement as a type of entitlement. A universal entitlement refers to a type of entitlement that is the same for all customers. In this regard, a universal entitlement can be offered to all customers of a business without audience segment qualification or personalization. An example of a universal entitlement can include a loyalty program credential entitling members to universal benefits under the program.

In some embodiments, the business user can define parameters for a categorical entitlement as a type of entitlement. A categorical entitlement refers to a type of entitlement that is the same for each customer within a specific audience segment. An audience segment refers to a specific group of individuals or businesses that share similar customer data, characteristics, needs, behaviors, or preferences. In this regard, a categorical entitlement can be offered to customers of a certain product or service who meet certain qualifying conditions. An example of a categorical entitlement can include a pre-defined warranty awarded only to customers that purchase a specific product or from a specific category of products.

In some embodiments, the business user can define parameters for a personalized entitlement as a type of entitlement. A personalized entitlement refers to a type of entitlement that is uniquely generated for a specific customer. In some embodiments, personalized entitlements can be dynamically assembled in batches and can include personalized parameters for the specific customer. In some embodiments, personalized entitlements can be dynamically assembled during real-time interactions with the customer and can include personalized parameters for the specific customer. In this regard, a business can define a personalized entitlement for a specific customer by defining variables, such as the parameter types, parameter data sources and benefits, which can be written into a personalized smart contract for the specific customer and deployed on a blockchain virtual machine. An example of a personalized entitlement can include a discount entitlement within a token on merchandise with a personalized discount rate, list of eligible products, and validity for a specific customer.

In some embodiments, an application provides an entitlement authoring workflow that allows the business user to define the various parameters related to the entitlements. For example, the application provides a number of user prompts in order to allow the business user to define the various parameters related to the entitlements. For example, the entitlement authoring workflow allows users to define details, such as whether the entitlements are transferable. In this regard, the prompts to define the various parameters related to the entitlements to guide the business user through the process of setting up these entitlements using templates and/or recommendations. In some embodiments, smart contract code can automatically be generated from the templates for the entitlements through entitlement authoring workflow. In this regard, smart contracts based on the automatically generated smart contract code can be deployed to a blockchain for executing transactions and recording entitlements. In some embodiments, the entitlement authoring workflow can guide users through the process of authoring legal terms and conditions governing customer transactions related to the blockchain-based entitlements.

Following an event triggering the offering of the entitlement, the entitlement can automatically be modified (e.g., customized/personalized) based on the customer data of the customer and recorded on blockchain (e.g., public blockchain or private blockchain). In this regard, a business can offer personalized, blockchain-based products and services to qualifying customers in response to real-time signals from customer data or scheduled events. For example, a change in customer data of a customer may trigger the offering of an entitlement to be recorded on blockchain. As a more specific example, a business deploys an entitlement to deliver a blockchain-based entitlement as a reward to each customer who checks in at one of the retail locations of the business. Following the customer data being updated (e.g., changed) to indicate that the customer checked-in at one of the retail locations of the business, the offering of the blockchain-based entitlement as a reward with the customer data of the customer can be triggered.

In embodiments, customer data for customers of the business may be updated in real-time or periodically. The customer data can include customer profiles of the customers, blockchain wallets as a channel for delivering blockchain-based entitlements for the customers, and/or any customer data. In this regard, the entitlement can be modified to include customer profile information, the blockchain wallet information of the customer before recording the entitlement on blockchain, and/or any customer data. In some embodiments, blockchain-based entitlements can be encoded in fungible and/or non-fungible tokens and delivered to a blockchain wallet belonging to the customer. In some embodiments, a blockchain wallet can be auto-provisioned for customers who have no blockchain wallet attached to their profile (e.g., via a third party provider). In some embodiments, personalized content based on the customer data of the customer can be attached blockchain-based entitlement. In some embodiments, blockchain-based entitlements can be linked to benefit redemption systems, such as a website or application, point-of-sale system, etc., allowing the customer to authenticate using the customer's blockchain wallet and redeem the blockchain-based entitlements.

In some embodiments, blockchain-based entitlements deployed by a business can be personalized and offered to customers in real-time or near real-time. In some embodiments, asynchronous transactions are performed by pushing offers to customers at scheduled intervals or upon a qualification that is not associated with a real-time customer interaction.

In some embodiments, customers can automatically be presented with corresponding universal entitlements recorded on blockchain and personalized based on the customer data of the customer after the business deploys a universal entitlement. For example, a business deploys a universal entitlement to deliver a blockchain-based entitlement as a unique membership for each customer enrolled in the member loyalty program of the business each year upon renewal. In this regard, the universal blockchain-based entitlement to each customer enrolled in the member loyalty program of the business is automatically generated and personalized to each customer on a yearly basis. As another example, business deploys a universal entitlement to deliver a blockchain-based entitlement for each customer enrolled in the member loyalty program of the business with a unique number of reward points based on purchase history of the customer. In this regard, the universal blockchain-based entitlement to each customer enrolled in the member loyalty program of the business is automatically generated and personalized to each customer based on the purchase history of each customer.

In some embodiments, individual customers can be qualified for categorical entitlements against pre-defined audience segments (e.g., as defined in the parameters of the entitlement by the business) using customer data (e.g., historical and/or real-time customer engagement information). In this regard, when a customer qualifies for an offer containing blockchain-based entitlement, the required sequence of steps for preparing the specific offer/transaction can be initiated. Customers can automatically be presented with corresponding categorical entitlements recorded on blockchain and personalized based on the customer data of the customer after the business deploys a categorical entitlement. For example, a business deploys a categorical entitlement to deliver a blockchain-based entitlement including access to specific media collections selected by the customer enrolled in the subscription service of the business. In this regard, the customer can be qualified based on the customer's subscription with the business and the blockchain-based categorical entitlement to each qualified customer is automatically generated and personalized to each customer based on the customer's selected media collection. As another example, a business deploys a categorical entitlement to deliver a blockchain-based entitlement as a reward to each consumer who checks in at one of its retail locations. In this regard, the customer can be qualified based on the customer's check-in at a retail location of the business and the blockchain-based categorical entitlement to each qualified customer is automatically generated and personalized to each customer based on customer details, such as the customer's name, etc. with a unique reward As another example, a business deploys a categorical entitlement to enable access to a consumer wallet upon purchasing a subscription service. In this regard, the customer can be qualified based on the customer's subscription with the business and the blockchain-based categorical entitlement to each qualified customer is automatically generated and personalized to each customer based on customer details, such as the customer's name, etc. with a unique wallet ID. As another example, a business deploys a categorical entitlement so that when a customer redeems a one-time entry token to an exclusive event, a new commemorative token is delivered to the customer's blockchain wallet as a keepsake and proof of the consumer's attendance at the event. In this regard, the customer can be qualified based on the customer's redemption of the token and the blockchain-based categorical entitlement to each qualified customer is automatically generated and personalized to each customer based on customer details, such as the customer's name, etc. to the customer's blockchain wallet.

In some embodiments, blockchain-based personalized entitlements can be uniquely generated for a specific customer responsive to certain events and the blockchain-based personalized entitlements can be recorded on blockchain. In this regard, Customers can automatically be presented with corresponding personalized entitlements recorded on blockchain and personalized based on the customer data of the customer after the business deploys a personalized entitlement. For example, a business deploys a personalized entitlement so that when a customer checks in using a hotel's mobile application, a blockchain-based personalized entitlement for room access is generated and delivered to the customer's blockchain wallet. In this regard, the event of the customer checking-in triggers the automatic generating of the unique room access key based on the blockchain-based personalized entitlement that is unique to the customer based on the customer's customer data. As another example, a business deploys a personalized entitlement so that when a physician logs a patient diagnosis, a blockchain-based personalized entitlement for pre-authorization for a magnetic resonance imaging is automatically generated. In this regard, the event of the physician logging the patient diagnosis triggers the automatic generating of the unique pre-authorization based on the blockchain-based personalized entitlement that is unique to the customer based on the customer's customer data. As another example, a business deploys a personalized entitlement so that when a flight is cancelled, blockchain-based personalized entitlements are automatically generated enabling a passenger to book an alternate flight the following day, book an overnight stay with a preferred hotel, cover taxi costs, and cover meal costs through an application or website. In this regard, the event of the flight being cancels triggers the automatic generating of the booking features through the application or website on the blockchain-based personalized entitlement that is unique to the customer based on the customer's customer data.

In some embodiments, the parameters of the entitlement may specify that the transaction requires qualifying customers for the entitlement to provide a blockchain signature in order to receive the blockchain-based entitlement. In this regard, communications may be automatically generated and sent to customers regarding the entitlement through various communication channels. The blockchain-based entitlement is delivered to the customer's blockchain wallet automatically following the customer provided a blockchain signature. The blockchain signature of the customer can be recorded with the blockchain-based entitlement. In some embodiments, the parameters of the entitlement may specify that the blockchain-based entitlement does not require qualifying customers to provide a signature. In this regard, blockchain-based entitlements that do not require a signature are generated asynchronously and the blockchain-based entitlement is delivered to the customer's blockchain wallet automatically.

Advantageously, efficiencies of computing and network resources can be enhanced using implementations described herein. In particular, the automated generating of blockchain-based entitlements that are customized based on the customer data of the customer provides for a more efficient use of computing resources (e.g., higher throughput and reduced latency for a network, less packet generation costs, etc.) than conventional methods of designing, programming and testing of each customized blockchain-based offering to develop each customized blockchain-based offering. The technology described herein results in less operations for the designing, programming and testing of customized blockchain-based offerings over a computer network, which results in higher throughput, reduced latency and less packet generation costs as fewer packets are sent over a network. Therefore, the technology described herein conserves network resources.

Overview of Exemplary Environments of Using Entitlements Deployed on Blockchain to Manage Customer Experiences Turning to FIG. 1, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 7.

It should be understood that operating environment 100 shown in FIG. 1 is an example of one suitable operating environment. Among other components not shown, operating environment 100 includes a user device 102, network 104, blockchain 106, customer data sources 116A-N, and blockchain-based entitlement customer experience manager 108. Each of the components shown in FIG. 1 can be implemented via any type of computing device, such as one or more of computing device 700 described in connection to FIG. 7, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) (e.g., a business offering blockchain-based entitlements to customers of the business, customers receiving blockchain-based entitlements, etc.). For example, in some implementations, such devices are the type of computing device described in relation to FIG. 7. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

User device 102 can be a client device on a client-side of operating environment 100, while blockchain-based entitlement customer experience manager 108 can be on a server-side of operating environment 100. Blockchain-based entitlement customer experience manager 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or blockchain-based entitlement customer experience manager 108 to remain as separate entities.

Application 110 operating on user device 102 can generally be any application capable of facilitating the exchange of information between the user device(s) and the blockchain-based entitlement customer experience manager 108 in defining entitlements offered by a business, presenting generated blockchain-based entitlements based parameters of the entitlements and customer data of customers of the business, and/or etc. In some implementations, the application(s) comprises a web application, which can run in a web browser, and could be hosted at least partially on the server-side of environment 100. In addition, or instead, the application(s) can comprise a dedicated application. In some cases, the application is integrated into the operating system (e.g., as a service). It is therefore contemplated herein that "application" be interpreted broadly.

In accordance with embodiments herein, the application 110 can facilitate using entitlements deployed on blockchain to manage customer experiences in an efficient and effective manner. In operation, a user, such as a business offering a smart contract or a customer of the business, can define parameters of entitlements offered by a business through a user interface provided via the application 110 displayed via a display screen of the user device 102. For example, application 110 can provide a number of user prompts in order to allow the user to define the various parameters related to the entitlements. The user can then select to deploy the entitlements offered by the business through a user interface provided via the application 110 displayed via a display screen of the user device 102.

The application 110 communicates with blockchain-based entitlement customer experience manager 108 the entitlements offered by the business. Blockchain-based entitlement customer experience manager 108 accesses and/or monitors customer data from customer data sources 116A-116N. Customer data sources 116a-116n may be any type of source providing data. Customer data refers to any data regarding a customer or customers. Customer data within a dataset may include, by way of example and not limitation, data that is sensed or determined from one or more sensors, such as location information of mobile device(s), smartphone data (such as phone state, charging data, date/time, or other information derived from a smartphone), activity information (for example: app usage; online activity; searches; browsing certain types of webpages; listening to music; taking pictures; voice data such as automatic speech recognition; activity logs; communications data including calls, texts, instant messages, and emails; website posts; other user data associated with communication events) including activity that occurs over more than one device, user history, session logs, application data, contacts data, calendar and schedule data, notification data, social network data, news (including popular or trending items on search engines or social networks), online gaming data, ecommerce activity, including customer journey data, sports data, health data, and nearly any other source of data that may be used to identify the customer.

The blockchain-based entitlement customer experience manager 108 can facilitate using entitlements deployed on blockchain to manage customer experiences by automatically generating blockchain-based entitlement for customers based on events, such as customer interactions or customer data. The blockchain-based entitlement customer experience manager 108 can facilitate the customizing of the blockchain-based entitlements for a customer based on the customer data of the customer stored in customer data sources 116A-116N. The blockchain-based entitlement customer experience manager 108 can facilitate recording the blockchain-based entitlement on blockchain 106 (e.g., public blockchain or private blockchain). The blockchain-based entitlement customer experience manager 108 can facilitate provided the blockchain-based entitlement to a customer (e.g., such as through application 110 for display via a display screen of the user device 102). The blockchain-based entitlement customer experience manager 108 can facilitate delivering the blockchain-based entitlement to the customer's wallet.

Generally, the blockchain-based entitlement customer experience manager 108 receives data from any number of devices. As such, the blockchain-based entitlement customer experience manager 108 can identify and/or collect data from various user devices, such as user device 102, and sources, such as data sources 116a-116n.

Customer data in customer data sources 116a-116n can be initially collected at remote locations or systems and transmitted to a data store for access by blockchain-based entitlement customer experience manager 108. In accordance with embodiments described herein, customer data collection may occur at data sources 116a-116n. In some cases, data sources 116a-116n, or portion thereof, may include servers, data stores, or other components, including computing devices operated by businesses (e.g., for customer data, etc.), public blockchain, private blockchain, etc. Customer data can be obtained at a data source periodically or in an ongoing manner (or at any time) and provided to the blockchain-based entitlement customer experience manager 108 to facilitate using entitlements deployed on blockchain to manage customer experiences.

Blockchain-based entitlement customer experience manager 108 can be or include a server, including one or more processors, and one or more computer-readable media. The computer-readable media includes computer-readable instructions executable by the one or more processors. The instructions can optionally implement one or more components of blockchain-based entitlement customer experience manager 108, described in additional detail below with respect to blockchain-based entitlement customer experience manager 202 of FIG. 2.

At a high level, blockchain-based entitlement customer experience manager 108 performs various functionality to facilitate efficient and effective generating and customizing of blockchain-based entitlements. For cloud-based implementations, the instructions on blockchain-based entitlement customer experience manager 108 can implement one or more components, and application 110 can be utilized by a user to interface with the functionality implemented on blockchain-based entitlement customer experience manager 108. In some cases, application 110 comprises a web browser. In other cases, blockchain-based entitlement customer experience manager 108 may not be required. For example, the components of blockchain-based entitlement customer experience manager 108 may be implemented completely on a user device, such as user device 102. In this case, blockchain-based entitlement customer experience manager 108 may be embodied at least partially by the instructions corresponding to application 110.

Thus, it should be appreciated that blockchain-based entitlement customer experience manager 108 may be provided via multiple devices arranged in a distributed environment that collectively provide the functionality described herein. Additionally, other components not shown may also be included within the distributed environment. In addition, or instead, blockchain-based entitlement customer experience manager 108 can be integrated, at least partially, into a user device, such as user device 102. Furthermore, blockchain-based entitlement customer experience manager 108 may at least partially be embodied as a cloud computing service.

Figure 2:
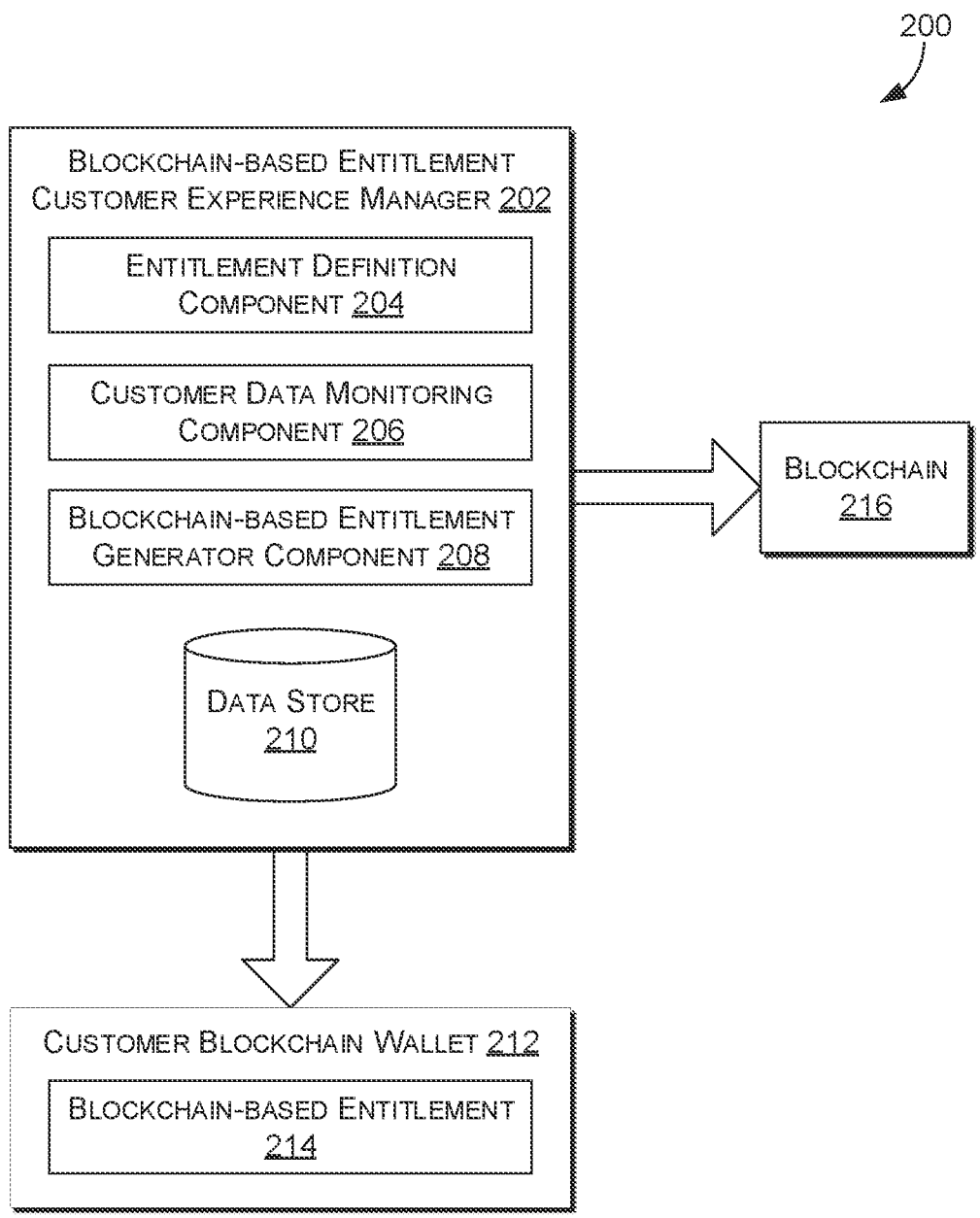
FIG. 2 depicts an example configuration of an operating environment in which some implementations of the present disclosure can be employed, in accordance with various embodiments of the present disclosure.

Referring to FIG. 2, aspects of an illustrative blockchain-based entitlement customer experience management system are shown, in accordance with various embodiments of the present disclosure. At a high level, embodiments described herein using entitlements deployed on blockchain to manage customer experiences. As shown in FIG. 2, blockchain-based entitlement customer experience manager 202 includes an entitlement definition component 204, a customer data monitoring component 206, a blockchain-based entitlement generator component 208, a customer data store 210, and an entitlement data store 212. The foregoing components of blockchain-based entitlement customer experience manager 202 can be implemented, for example, in operating environment 100 of FIG. 1. In particular, those components may be integrated into any suitable combination of user devices 102 and/or blockchain-based entitlement customer experience manager 108.

Data store 210 can store computer instructions (e.g., software program instructions, routines, or services), data, such as customer data, data related to entitlements, etc., and/or components/models used in embodiments described herein. In some implementations, data store 210 stores information or data received or generated via the various components of blockchain-based entitlement customer experience manager 202 and provides the various components with access to that information or data, as needed. Although depicted as one component, data store 210 may be embodied as one or more data stores. Further, the information in data store 210 may be distributed in any suitable manner across one or more data stores for storage (which may be hosted externally).

In embodiments, data stored in data store 210 includes customer data, data related to entitlements, such as definitions, parameters, templates, blockchain-based entitlements, and/or the like. In some cases, blockchain-based entitlement customer experience manager 202, or components associated therewith, can obtain data from client devices (e.g., customer data, data generated by devices of the business, etc.). In some cases, data can be received from one or more data stores in the cloud, or data generated by the blockchain-based entitlement customer experience manager 202.

The entitlement definition component 204 is generally configured to customize parameters of entitlements offered by the business. The entitlement definition component 204 can include rules, conditions, associations, models, algorithms, or the like to customize parameters of entitlements offered by the business. In embodiments, entitlement definition component 204 is configured so that entitlements can be designed and/or deployed by a business in order to record the entitlements on blockchain 216 (e.g., public blockchain or private blockchain) following certain events, such as interactions with customers. For example, a business user (e.g., a user associated with the business) can define various types of entitlements through entitlement definition component 204, including parameters related to the entitlements, services, subscriptions, benefits, and/or etc., that the business offers to customers (e.g., as part of their commercial product and service offerings, promotional and loyalty programs, etc.). In some embodiments, the business user defines how the customers access or redeem entitlement benefits (e.g., access subscription content, enter a venue, return a product, access customer support, etc.) through entitlement definition component 204. In some embodiments, the entitlements generated through entitlement definition component 204 can be stored in data store 210.

In some embodiments, the business user can define parameters for a universal entitlement as a type of entitlement through entitlement definition component 204. In some embodiments, the business user can define parameters for a categorical entitlement as a type of entitlement through entitlement definition component 204. In some embodiments, the business user can define parameters for a personalized entitlement as a type of entitlement through entitlement definition component 204.

In some embodiments, entitlement definition component 204 provides an entitlement authoring workflow (e.g., through a user interface of application 110 of device 102 of FIG. 1) that allows the business user to define the various parameters related to the entitlements. For example, entitlement definition component 204 provides a number of user prompts in order to allow the business user to define the various parameters related to the entitlements. For example, the entitlement authoring workflow of entitlement definition component 204 allows users to define details, such as whether the entitlements are transferable. In this regard, the prompts to define the various parameters related to the entitlements to guide the business user through the process of setting up these entitlements using templates and/or recommendations. In some embodiments, smart contract code can automatically be generated from the templates for the entitlements through entitlement authoring workflow of entitlement definition component 204. In this regard, smart contracts based on the automatically generated smart contract code can be deployed to a blockchain for executing transactions and recording entitlements on blockchain 216. In some embodiments, the entitlement authoring workflow of entitlement definition component 204 can guide users through the process of authoring legal terms and conditions governing customer transactions related to the blockchain-based entitlements.

The customer data monitoring component 206 is generally configured to monitor customer data for events triggering deployed entitlements. The customer data monitoring component 206 can include rules, conditions, associations, models, algorithms, or the like to monitor customer data for events triggering deployed entitlements. For example, customer data monitoring component 206 may comprise natural language processing techniques, statistical model, fuzzy logic, neural network, finite state machine, support vector machine, logistic regression, clustering, or machine-learning techniques, similar statistical classification processes, or combinations of these to monitor customer data for events triggering deployed entitlements.

The blockchain-based entitlement generator component 208 is generally configured to generate blockchain-based entitlements based on parameters of entitlements offered by a business with customer data for specific customers of the business (e.g., by accessing customer data stored in data store 210). The blockchain-based entitlement generator component 208 can include rules, conditions, associations, models, algorithms, or the like to generate blockchain-based entitlements based on parameters of entitlements offered by a business with customer data for specific customers of the business. For example, blockchain-based entitlement generator component 208 may comprise natural language processing techniques, statistical model, fuzzy logic, neural network, finite state machine, support vector machine, logistic regression, clustering, or machine-learning techniques, similar statistical classification processes, or combinations of these to generate blockchain-based entitlements based on parameters of entitlements offered by a business with customer data for specific customers of the business.

In embodiments, following an event triggering the offering of the entitlement, such as a change in customer data stored in data store 210 and monitored by customer data monitoring component 206, the entitlement can automatically be modified (e.g., customized/personalized) based on the customer data of the customer and recorded on blockchain 216 (e.g., public blockchain or private blockchain) by blockchain-based entitlement generator component 208. In this regard, a business can offer personalized, blockchain-based products and services to qualifying customers in response to real-time signals from customer data or scheduled events.

In embodiments, customer data for customers of the business may be updated in real-time or periodically for storage in data store 210, monitoring by customer data monitoring component 206, and/or accessing by blockchain-based entitlement generator component 208.

In some embodiments, blockchain-based entitlements deployed by a business can be personalized and offered to customers in real-time or near real-time by blockchain-based entitlement generator component 208. In some embodiments, asynchronous transactions are performed by pushing offers to customers at scheduled intervals or upon a qualification that is not associated with a real-time customer interaction by blockchain-based entitlement generator component 208.

In some embodiments, customers can automatically be presented with corresponding universal entitlements recorded on blockchain 216 and personalized based on the customer data of the customer after the business deploys a universal entitlement by blockchain-based entitlement generator component 208.

In some embodiments, individual customers can be qualified for categorical entitlements against pre-defined audience segments (e.g., as defined in the parameters of the entitlement by the business) using customer data (e.g., historical and/or real-time customer engagement information) stored in data store 210 by customer data monitoring component 206 and/or blockchain-based entitlement generator component 208. Blockchain-based entitlement generator component 208 can automatically present customers with corresponding categorical entitlements recorded on blockchain 216 and personalized based on the customer data of the customer after the business deploys a categorical entitlement.

In some embodiments, blockchain-based personalized entitlements can be uniquely generated by blockchain-based entitlement generator component 208 for a specific customer responsive to certain events (e.g., such as changes to customer data monitored by customer data monitoring component 206) and the blockchain-based personalized entitlements can be recorded on blockchain 216 by blockchain-based entitlement generator component 208. Blockchain-based entitlement generator component 208 can automatically present customers with corresponding personalized entitlements recorded on blockchain 216 and personalized based on the customer data of the customer after the business deploys a personalized entitlement.

In some embodiments, the parameters of the entitlement (e.g., as defined through entitlement definition component 204) may specify that the transaction requires qualifying customers for the entitlement to provide a blockchain signature in order to receive the blockchain-based entitlement 214. In this regard, communications may be automatically generated by blockchain-based entitlement generator component 208 and sent to customers regarding the entitlement through one or more communication channels. In this regard, the blockchain-based entitlement 214 is delivered by blockchain-based entitlement generator component 208 to the customer's blockchain wallet 212 automatically following the customer provided a blockchain signature. The blockchain signature of the customer can be recorded on blockchain 216 with the blockchain-based entitlement 214. In some embodiments, the parameters of the entitlement (e.g., as defined through entitlement definition component 204) may specify that the transaction does not require qualifying customers for the entitlement to provide a blockchain signature in order to receive the blockchain-based entitlement 214. In this regard, the blockchain-based entitlement 214 that do not require a signature is generated asynchronously by blockchain-based entitlement generator component 208 and the blockchain-based entitlement 214 is delivered to the customer's blockchain wallet 212 automatically.

Figure 3:
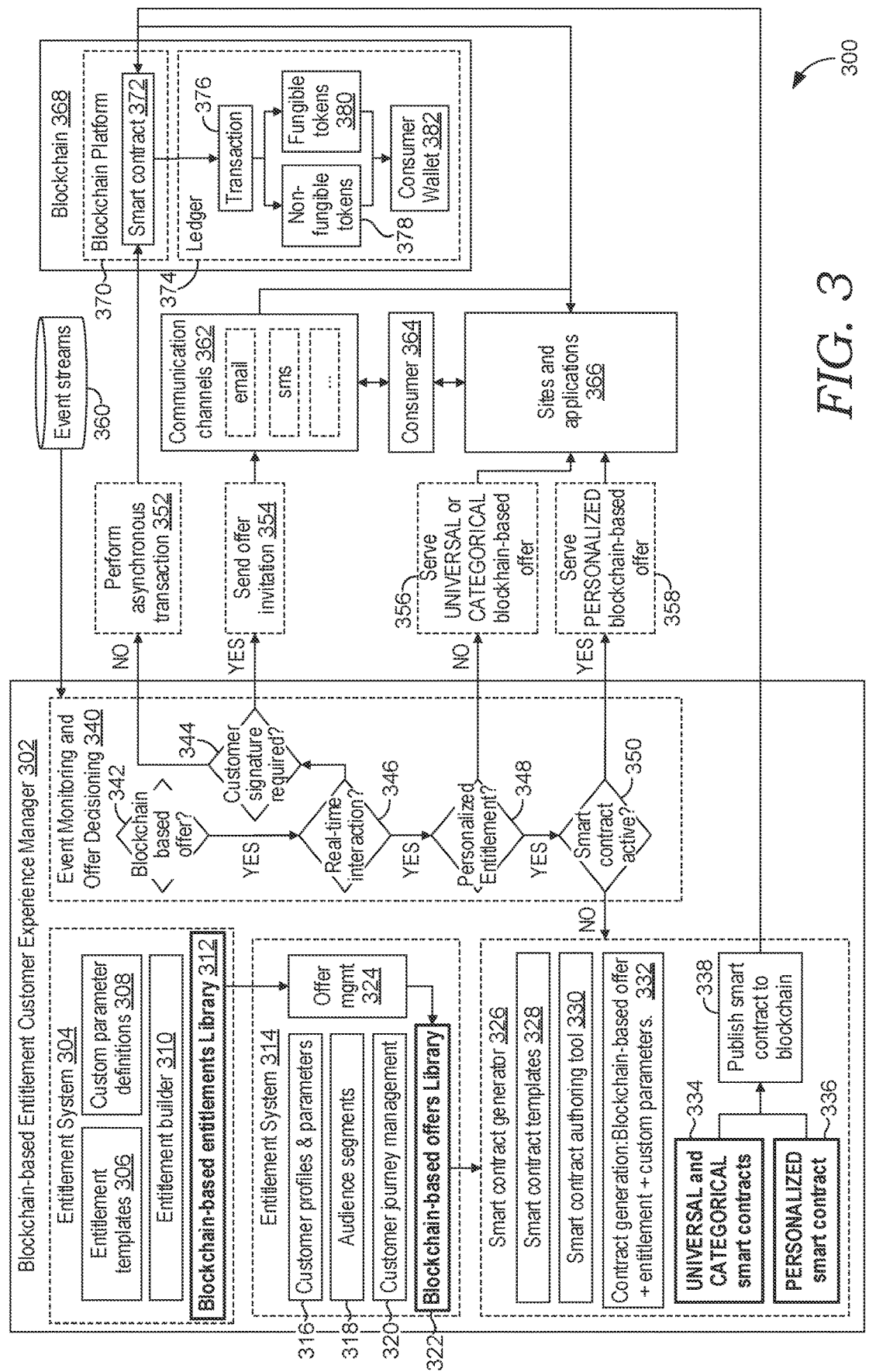
FIG. 3 provides an example diagram of a model implemented to use entitlements deployed on blockchain to manage customer experiences, in accordance with embodiments of the present disclosure.

FIG. 3 provides an example diagram of an example model implemented to use entitlements deployed on blockchain to manage customer experiences, in accordance with embodiments described herein. As described herein, such a model can be used to generate blockchain-based entitlements personalized for customers in an automated manner. Diagram 300 is an example diagram for an example model implemented to use entitlements deployed on blockchain to manage customer experiences.

As shown, blockchain-based entitlement customer experience manager 302 includes entitlement system 304, customer experience management system 314, smart contract generator 326, and implements event monitoring and offer decisioning 340. As well, blockchain-based entitlement customer experience manager 302 communicates with event streams 360, communication channels 362 with consumer 364, websites and applications 366, and blockchain 368.

Entitlement system 304 is configured so that entitlements can be designed and/or deployed by a business in order to record the entitlements (e.g., as a smart contract 372) on blockchain 368 (e.g., public blockchain or private blockchain) following certain events (e.g., provided by event streams 360). For example, a business user (e.g., a user associated with the business) can define various types of entitlements through entitlement system 304, including parameters related to the entitlements, services, subscriptions, benefits, and/or etc., that the business offers to customers (e.g., as part of their commercial product and service offerings, promotional and loyalty programs, etc.). In some embodiments, the business user defines how the customers access or redeem entitlement benefits (e.g., access subscription content, enter a venue, return a product, access customer support, etc.) through entitlement system 304.

In some embodiments, entitlement system 304 provides entitlement templates 306 for a user to utilize to design entitlements. In some embodiments, a business user can provide customer parameter definitions in entitlement 304 to provide custom parameters to build entitlements. In some embodiments, entitlement system 304 provides an entitlement authoring workflow via entitlement builder 310 that allows the business user to define the various parameters related to the entitlements. For example, entitlement builder 310 provides a number of user prompts in order to allow the business user to define the various parameters related to the entitlements. In this regard, the prompts to define the various parameters related to the entitlements guide the business user through the process of setting up these entitlements using templates 306, custom parameter definitions 308, and/or entitlement builder 310. The entitlements can be stored and deployed through blockchain-based entitlements library 312. In some embodiments, smart contract code for a smart contract 372 can automatically be generated through entitlement system 304 for the entitlements and recorded on blockchain platform 370 of blockchain 368 for executing transactions and recording entitlements on blockchain 368.

Customer experience management system 314 includes customer profiles and parameters 316 (e.g., customer data), data related to the audience segment 318 of the business, data related to the management of customer journeys 320, etc. In this regard, following an event triggering the offering of the entitlement (e.g., as monitored through event streams 360), offer management component 324 of customer experience management system 314 can automatically generate the blockchain-based entitlement stored in blockchain-based entitlements library 312 as a blockchain-based entitlement based on the customer data of the customer of customer experience management system 314 in order to record the blockchain-based entitlement on blockchain 370. The blockchain-based entitlement offer for the customer can be stored in blockchain-based offers library 322. For example, the blockchain-based entitlement can be recorded on ledger 374 as a transaction 376 in order to provide a non-fungible token 378 and/or a fungible token 380 to the consumer wallet 382 of the consumer 364 as a blockchain-based entitlement.

The blockchain-based entitlement can be modified to include customer profile information (customer profiles and parameters 316), the blockchain wallet information (e.g., consumer wallet 382) of the customer before recording the entitlement on blockchain, and/or any customer data from customer experience management system 314. In some embodiments, blockchain-based entitlements can be linked to benefit redemption systems, such as a website or application 366, point-of-sale system, etc., allowing the customer to authenticate using the customer's blockchain wallet 382 and redeem the blockchain-based entitlements (e.g., non-fungible token 378 and/or a fungible token 380).

Smart contract generator 326 automatically generates smart contract code for a smart contract 372 through entitlement system 304 for the blockchain-based entitlements. The smart contract 372 can then be recorded on blockchain platform 370 of blockchain 368 for executing transactions 376 related to the blockchain-based entitlements (e.g., non-fungible token 378 and/or a fungible token 380). Smart contract generator 326 can include smart contract templates 328, smart contract authoring tool 330, and contract generation component 332 in order to generate smart contracts based on the blockchain-based entitlements designed through entitlement system 304. For example, smart contract code can automatically be generated from the smart contract templates 328 that correspond to the entitlement templates 306. In some embodiments, smart contract authoring tool 330 can guide users through the process of authoring smart contracts related to the blockchain-based entitlements of entitlements system 304. Contract generation component 332 can then generate the smart contract to include the blockchain-based entitlement off with any customers of the smart contract in order to record the smart contract 372 on blockchain platform 370. In some embodiments, smart contract authoring tool 330 can guide users through the process of authoring legal terms and conditions governing customer transactions related to the blockchain-based entitlements.

The smart contract generator 326 is configured to generate universal and categorical smart contracts 334 (e.g., smart contracts based on universal entitlements and/or smart contracts based on categorical entitlements) and personalized smart contracts 336 (e.g., smart contracts based on personalized entitlements) in order to publish the smart contracts to blockchain at block 338.

Blockchain-based entitlement customer experience manager 302 implements event monitoring and offer decisioning 340. For example, event streams 360, such as real-time data streams from traditional web2 data sources, blockchain transactions, customer data, etc., are received and it is determined whether the event stream 360 triggers any blockchain-based offers for a blockchain-based entitlement (e.g., from blockchain-based entitlements library 312 and/or blockchain-based offers library 322) at block 342. At block 346, if it is not a real-time interaction with a customer, block 344 is executed. At block 344, if no signature is required based on the parameters of the blockchain-based entitlement, an asynchronous transaction 352 can be performed to automatically execute the smart contract 372 of the blockchain-based entitlement to deliver the blockchain-based entitlement to the customers' blockchain wallet (e.g., consumer wallet 382). At block 344, if a signature is required based on the parameters of the blockchain-based entitlement, the blockchain-based offer for the blockchain-based entitlement can be sent as an offer invitation 354 through various communication channels 362. Following receiving the blockchain signature of the customer (e.g., consumer 362), smart contract 372 can be executed to so that transaction 352 can be performed to deliver the blockchain-based entitlement to the customers' blockchain wallet (e.g., consumer wallet 382).

At block 346, if it is a real-time interaction with a customer, block 348 is executed. At block 348, if the blockchain-based offer does not correspond to a personalized entitlement, the universal or categorical blockchain-based offer is served to the customer (e.g., consumer 364) at block 356. At block 348, if the blockchain-based offer corresponds to a personalized entitlement, block 350 is executed. At block 350, if the smart contract corresponding to the blockchain-based offer of the blockchain-based entitlement is active, the personalized blockchain-based offer is served to the customer (e.g., consumer 364) at block 358. At block 350, if the smart contract corresponding to the blockchain-based offer of the blockchain-based entitlement is not active, the business user generates the contract through smart contract generator 326.

Figure 4:
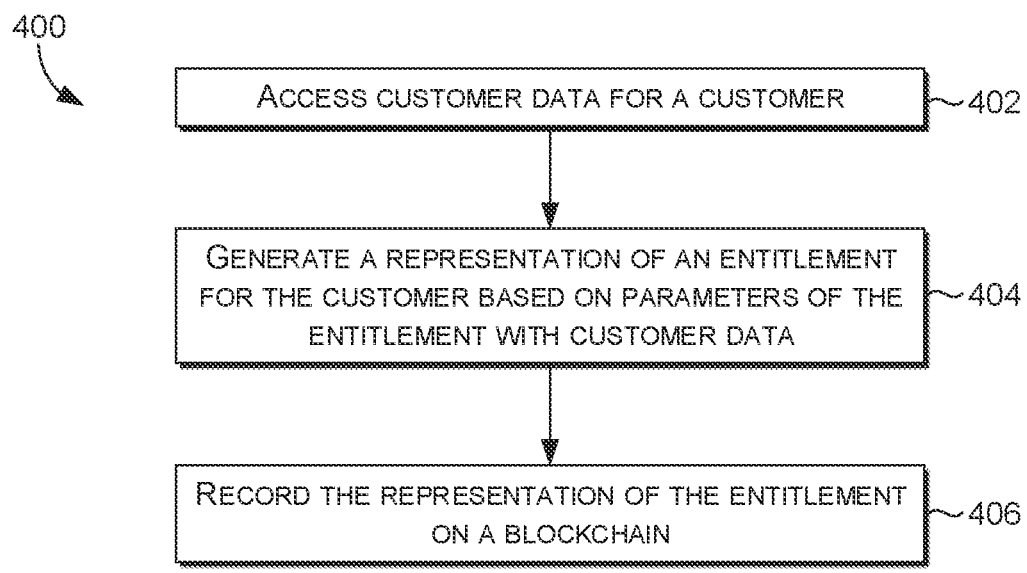
FIG. 4 is a process flow showing a method for using entitlements deployed on blockchain to manage customer experiences, in accordance with embodiments of the present disclosure.
Figure 5:
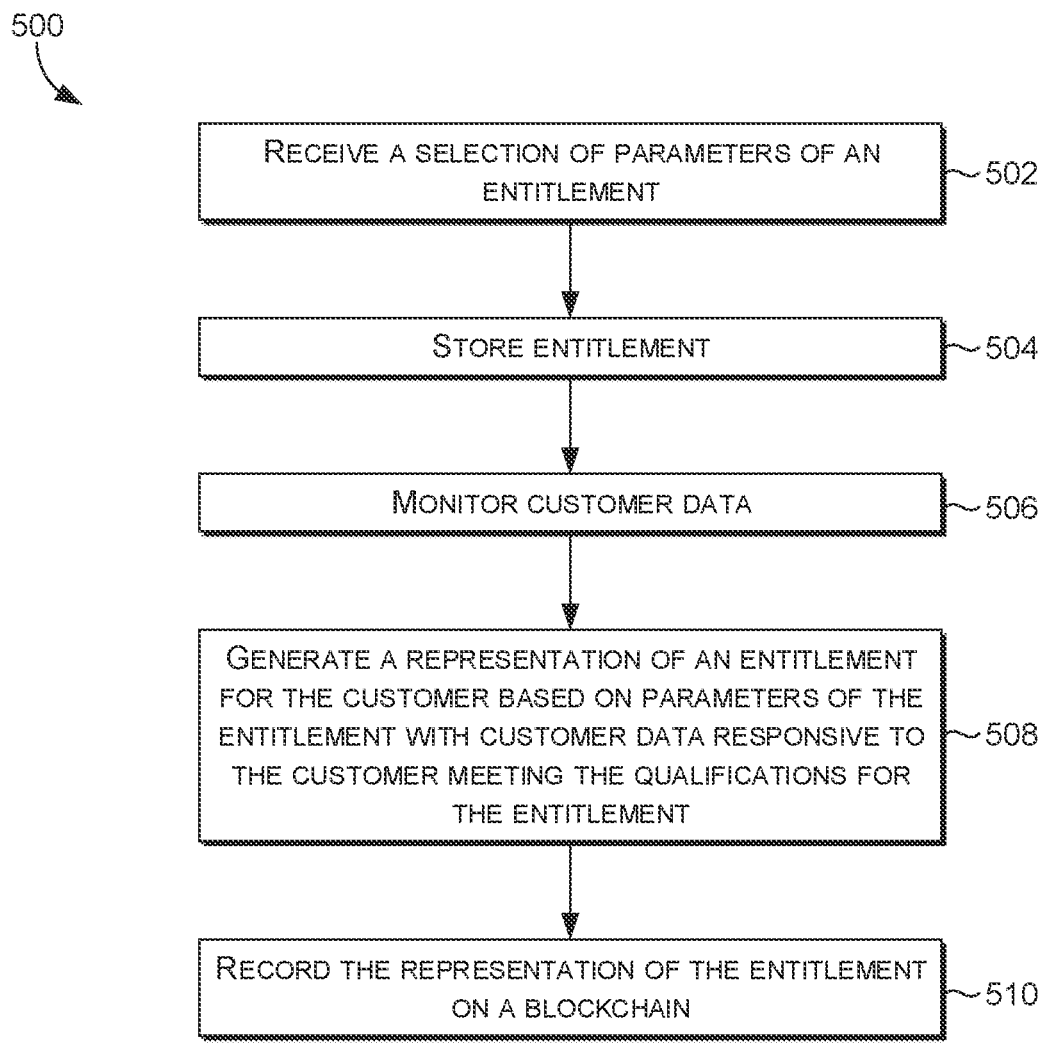
FIG. 5 is a process flow showing a method for using entitlements deployed on blockchain to manage customer experiences, in accordance with embodiments of the present disclosure.
Figure 6:
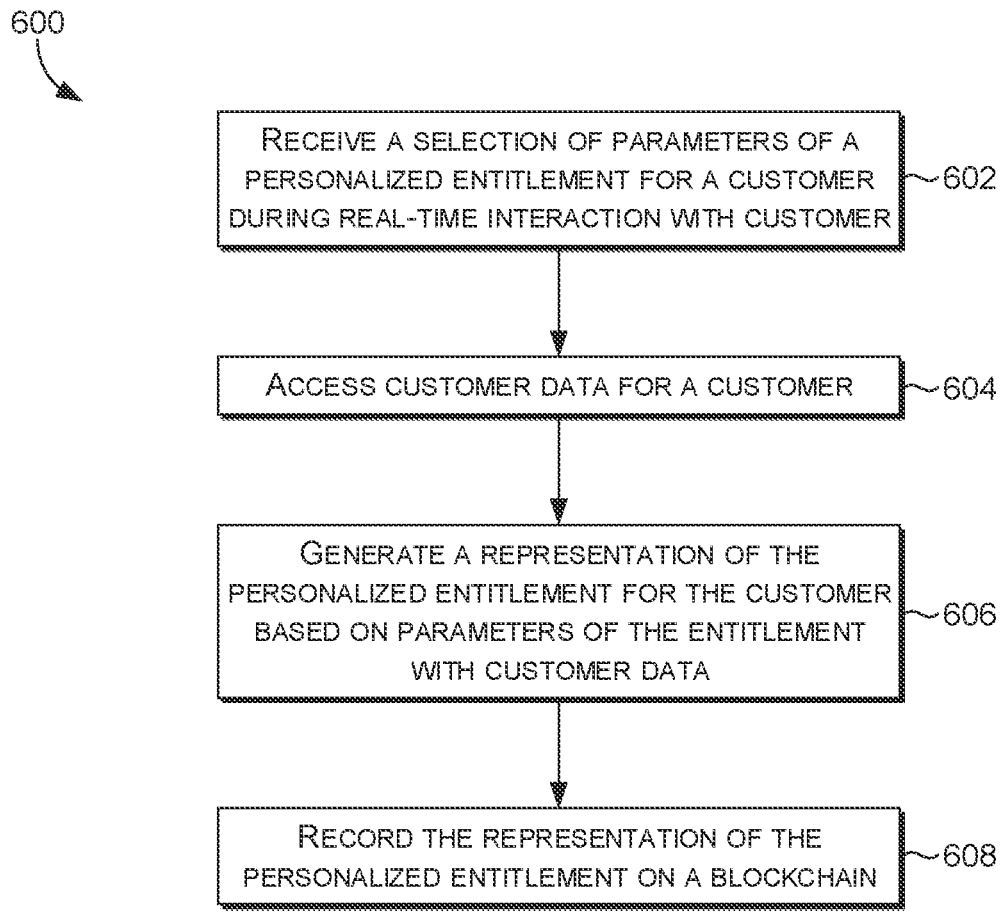
FIG. 6 is a process flow showing a method for using entitlements deployed on blockchain to manage customer experiences, in accordance with embodiments of the present disclosure.

Exemplary Implementations of Using Entitlements Deployed on Blockchain to Manage Customer Experiences With reference now to FIGS. 4-6, FIGS. 4-6 provide method flows related to facilitating using entitlements deployed on blockchain to manage customer experiences, in accordance with embodiments of the present technology. Each block of method 400, 500 and 600 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 4-6 are exemplary only and not intended to be limiting. As can be appreciated, in some embodiments, method flows 400-600 can be implemented, at least in part, to facilitate using entitlements deployed on blockchain to manage customer experiences.

Turning to FIG. 4, a flow diagram 400 is provided showing an embodiment of a method 400 for using entitlements deployed on blockchain to manage customer experiences, in accordance with embodiments described herein. Initially, at block 402, customer data for a customer is accessed. For example, customer data may be accessed from a customer data store or may be accessed from real-time data during a customer interaction. At block 404, a representation of an entitlement for the customer is generated based on parameters of the entitlement where the representation of the entitlement for the customer includes customer data of the customer. For example, the representation of the entitlement may include a blockchain-based entitlement, an offer for a blockchain-based entitlement, a smart contract based on the blockchain-based entitlement or offer, and/or etc. At block 406, the representation of the entitlement is recorded on a blockchain (e.g., a public blockchain or a private blockchain).

Turning now to FIG. 5, a flow diagram 500 is provided showing an embodiment of a method 500 for using entitlements deployed on blockchain to manage customer experiences, in accordance with embodiments described herein. Initially, at block 502, a selection of parameters of an entitlement is received. At block 504, the entitlement is stored. For example, a business user (e.g., a user associated with the business) can define various types of entitlements, including parameters related to the entitlements, services, subscriptions, benefits, and/or etc., that the business offers to customers (e.g., as part of their commercial product and service offerings, promotional and loyalty programs, etc.). In some embodiments, the business user defines how the customers access or redeem entitlement benefits (e.g., access subscription content, enter a venue, return a product, access customer support, etc.). In some embodiments, the business user can define parameters for a universal entitlement as a type of entitlement. In some embodiments, the business user can define parameters for a categorical entitlement as a type of entitlement. In some embodiments, the business user can define parameters for a personalized entitlement as a type of entitlement.

At block 506, customer data for customers is monitored. For example, the customer data may be monitored for changes to customer data that would trigger offers for blockchain-based entitlements based on parameters of the blockchain-based entitlements. At block 508, responsive to the customer meeting the qualifications for the entitlement, a representation of an entitlement for the customer is generated based on parameters of the entitlement, where the representation of the entitlement for the customer includes customer data of the customer. At block 510, the representation of the entitlement is recorded on a blockchain (e.g., a public blockchain or a private blockchain).

Turning now to FIG. 6, a flow diagram 600 is provided showing an embodiment of a method 600 for training a generative AI model for automated analysis of smart contracts on blockchain, in accordance with embodiments described herein. Initially, at block 602, a selection of parameters of a personalized entitlement for a customer is received during a real-time interaction with the customer. For example, a customer and/or a business may select specific parameters for a corresponding personalized entitlement for the customer. At block 604, the customer data for the customer is accessed. For example, customer data may be accessed from a customer data store or may be accessed from real-time data during a customer interaction.

At block 606, a representation of the personalized entitlement for the customer is generated based on parameters of the personalized entitlement where the representation of the entitlement for the customer includes customer data of the customer. At block 608, the representation of the personalized entitlement is recorded on a blockchain (e.g., a public blockchain or a private blockchain).

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 7:
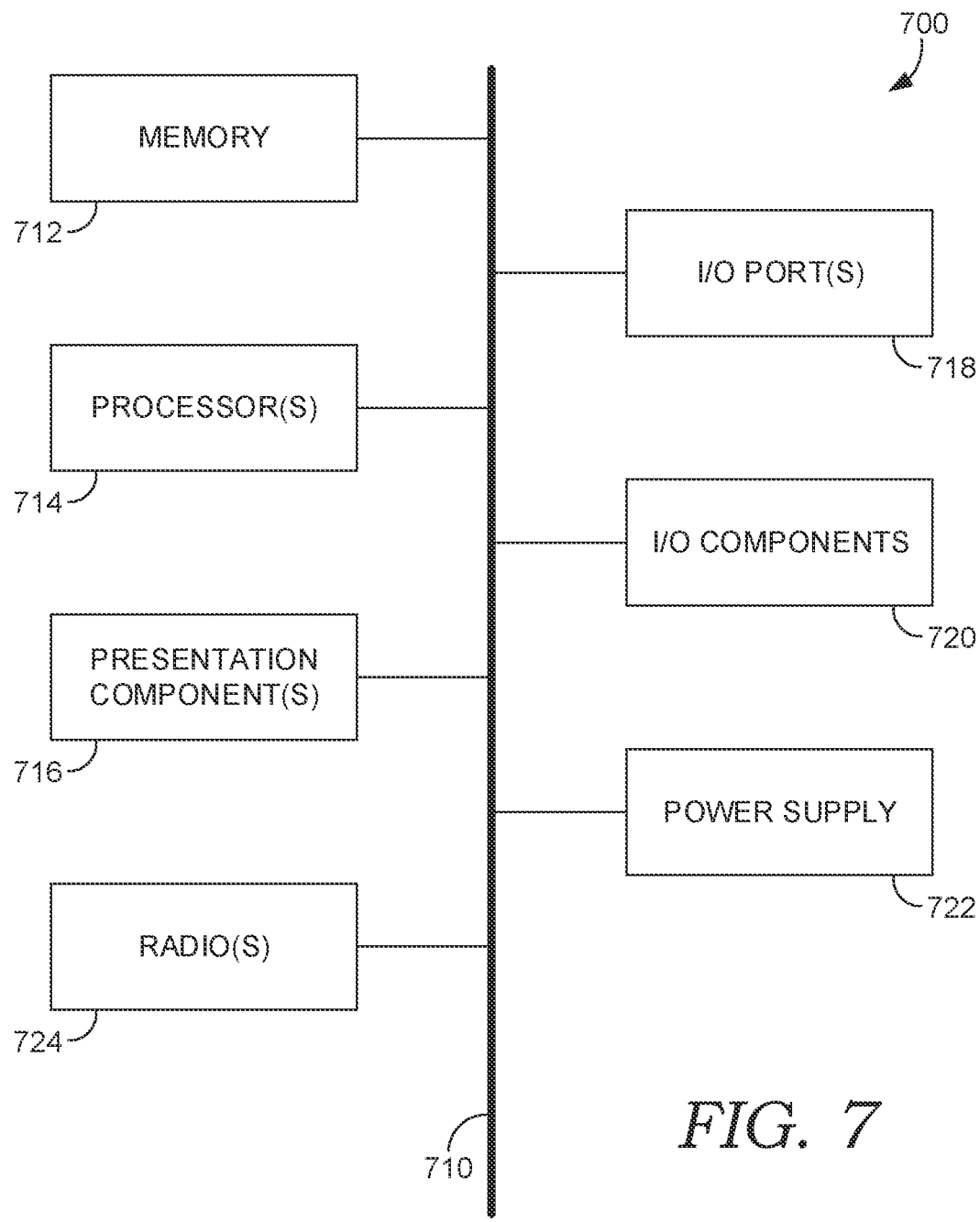
FIG. 7 is a block diagram of an example computing device in which embodiments of the present disclosure can be employed.

Referring to the drawings in general, and initially to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," and "handheld device," as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
   accessing, via a blockchain-based entitlement generator component, customer data for a customer and parameters of an entitlement, wherein one of the parameters indicates that a blockchain signature is not required;
   trigger-generating, via the blockchain-based entitlement generator component, a representation of the entitlement for the customer asynchronously upon qualification of the customer data meeting other parameters of the parameters of the entitlement to cause delivery of the representation of the entitlement automatically to a blockchain wallet of the customer when the one of the parameters indicates that the blockchain signature is not required, the representation of the entitlement comprising a portion of the customer data for the customer; and
   causing recording, via the blockchain-based entitlement generator component, of the representation of the entitlement on a blockchain.

2. The computer-implemented method of claim 1, wherein one of the other parameters of the entitlement indicates the entitlement to be at least one of a universal entitlement, a categorical entitlement, and a personalized entitlement; the portion of the customer data for the customer comprises the blockchain wallet of the customer; and the representation of the entitlement comprises a reference to website or application for redeeming the entitlement.

3. The computer-implemented method of claim 1, wherein at least one of the other parameters of the entitlement indicates the entitlement to be a categorical entitlement for an audience segment and the customer data indicates the customer to be qualified as the audience segment.

4. The computer-implemented method of claim 3, wherein the representation of the entitlement for the customer is triggered to be generated asynchronously upon qualification of the customer as the audience segment following a change to the customer data.

5. The computer-implemented method of claim 3, wherein the representation of the entitlement for the customer is triggered to be generated asynchronously at a scheduled interval following qualification of the customer as the audience segment through historical data of the customer data.

6. The computer-implemented method of claim 1, wherein at least one of the other parameters of the entitlement indicates the entitlement to be a personalized entitlement; the representation of the entitlement for the customer is triggered to be generated asynchronously after a real-time interaction with the customer; the portion of the customer data for the customer comprises the blockchain wallet of the customer and a name of the customer; and the representation of the entitlement comprises a smart contract comprising a reference to website or application for redeeming the entitlement.

7. One or more computer-readable media having a plurality of executable instructions embodied thereon, which, when executed by one or more processors, cause the one or more processors to perform a method comprising:
 receiving, via an entitlement definition component, a selection of parameters of an entitlement, wherein one of the parameters indicates that a blockchain signature is not required;
 monitoring, via a customer data monitoring component, customer data for a customer;
 trigger-generating, via a blockchain-based entitlement generator component, a representation of the entitlement for the customer asynchronously upon qualification of the customer data with other parameters of the parameters of the entitlement to cause delivery of the representation of the entitlement automatically to a blockchain wallet of the customer when the one of the parameters indicates that the blockchain signature is not required, the representation of the entitlement comprising a portion of the customer data for the customer and an indication of a particular benefit provided by the entitlement for a particular product or service; and
 causing recording, via the blockchain-based entitlement generator component, of the representation of the entitlement on a blockchain.

8. The media of claim 7, wherein one of the other parameters of the entitlement indicates the entitlement to be at least one of a universal entitlement, a categorical entitlement, and a personalized entitlement; the portion of the customer data for the customer comprises the blockchain wallet of the customer; and the representation of the entitlement comprises a reference to website or application for redeeming the entitlement.

9. The media of claim 7, wherein at least one of the other parameters of the entitlement indicates the entitlement to be a categorical entitlement for an audience segment and the customer data indicates the customer to be qualified as the audience segment.

10. The media of claim 9, wherein the representation of the entitlement for the customer is triggered to be generated asynchronously upon qualification of the customer as the audience segment following a change to the customer data.

11. The media of claim 9, wherein the representation of the entitlement for the customer is triggered to be generated asynchronously at a scheduled interval following qualification of the customer as the audience segment through historical data of the customer data.

12. The media of claim 7, wherein at least one of the other parameters of the entitlement indicates the entitlement to be a personalized entitlement; the representation of the entitlement for the customer is triggered to be generated asynchronously after a real-time interaction with the customer; the portion of the customer data for the customer comprises the blockchain wallet of the customer and a name of the customer; and the representation of the entitlement comprises a smart contract comprising a reference to website or application for redeeming the entitlement.

13. A computing system comprising:
 a processor; and
 a non-transitory computer-readable medium having stored thereon instructions that when executed by the processor, cause the processor to perform operations including:
 storing, via an entitlement definition component, parameters of an entitlement, wherein one of the parameters indicates that a blockchain signature is not required and a different one of the parameters designating a qualification for the entitlement;
 monitoring, via a customer data monitoring component, customer data for a customer;
 responsive to the customer meeting the qualification for the entitlement based on the customer data of the customer, trigger-generating, via a blockchain-based entitlement generator component, a representation of the entitlement for the customer asynchronously upon the customer data meeting the qualification of the different one of the parameters of the entitlement to cause delivery of the representation of the entitlement automatically to a blockchain wallet of the customer when the one of the parameters indicates that the blockchain signature is not required, the representation of the entitlement comprising a portion of the customer data for the customer; and
 causing recording, via the blockchain-based entitlement generator component, of the representation of the entitlement on a blockchain.

14. The system of claim 13, wherein the different one of the parameters of the entitlement indicates the entitlement to be a categorical entitlement for an audience segment and the customer data indicates the customer to be qualified as the audience segment.

15. The system of claim 14, wherein the representation of the entitlement for the customer is triggered to be generated asynchronously upon qualification of the customer as the audience segment following a change to the customer data.

16. The system of claim 14, wherein the representation of the entitlement for the customer is triggered to be generated asynchronously at a scheduled interval following qualification of the customer as the audience segment through historical data of the customer data.

* * * * *